US005349360A

United States Patent [19]

Matsui

[11] Patent Number: 5,349,360

[45] Date of Patent: Sep. 20, 1994

[54] ELECTRONICALLY CONTROLLED ANTENNA SYSTEM

[75] Inventor: Hiroyasu Matsui, Yokohama, Japan

[73] Assignee: Nissan Motor Co., Ltd., Yokohama, Japan

[21] Appl. No.: 24,126

[22] Filed: Mar. 1, 1993

[30] Foreign Application Priority Data

Mar. 13, 1992 [JP] Japan .................................. 4-089832

[51] Int. Cl.$^5$ ......................... H01Q 3/02; H01Q 3/24; H04B 1/06

[52] U.S. Cl. ................................. 342/374; 455/277.1; 343/876

[58] Field of Search ............... 342/350, 374, 377, 357; 343/700 MS, 713, 724, 876; 455/277.1, 65, 283

[56] References Cited

U.S. PATENT DOCUMENTS

| | | | |
|---|---|---|---|
| 3,922,685 | 11/1975 | Opas | 343/876 |
| 4,379,296 | 4/1983 | Farrar et al. | 343/700 MS |
| 4,499,606 | 2/1985 | Rambo | 455/277.1 |
| 4,538,153 | 8/1985 | Taga | 343/700 MS |
| 4,887,089 | 12/1989 | Shibata et al. | 343/700 MS |
| 5,166,693 | 11/1992 | Nishikawa et al. | 342/422 |

FOREIGN PATENT DOCUMENTS

| | | |
|---|---|---|
| 0432647 | 6/1991 | European Pat. Off. . |
| 1442014 | 7/1976 | United Kingdom . |
| 2090070 | 6/1982 | United Kingdom . |

OTHER PUBLICATIONS

Shimura et al. "A Development of GMSK/TDMA System With Adaptive Array In Land Mobile Communications" IEICE Technical Report vol. 89 No. 250, pp. 75–80.

*Primary Examiner*—Gregory C. Issing
*Attorney, Agent, or Firm*—Lowe, Price, LeBlanc & Becker

[57] ABSTRACT

An electronically controlled antenna system comprises an antenna having a plurality of antenna elements, a first device for producing a plurality of antenna modes by using the antenna elements, a second device for detecting a current position of the antenna, and a third device for switching the antenna modes of the first device in accordance with the current position detected by the second device.

11 Claims, 9 Drawing Sheets

FIG. 3A

| NODE NO. | COORDINATE α, β | ATTRIBUTE |
|---|---|---|
| 1 | α1, β1 | ACTIVE CONT. |
| 2 | α1, β2 | ACTIVE CONT. |
| 3 | α1, β3 | ACTIVE CONT. |
| 4 | α1, β4 | ACTIVE CONT. |
| 5 | α2, β1 | ACTIVE CONT. |
| 6 | α2, β2 | DIVERSITY |
| 7 | α2, β3 | DIVERSITY |
| 8 | α1, β4 | ACTIVE CONT. |
| | | |

NODE IN DESIGNATED AREA (nodes 6–7)

FIG. 3B

| LINK NO. | LEADING NODE NO. | TERMINAL NODE NO. | ATTRIBUTE |
|---|---|---|---|
| (1) | 1 | 5 | ACTIVE CONT. |
| (2) | 2 | 6 | ACTIVE CONT. |
| (3) | 13 | 7 | ACTIVE CONT. |
| (4) | 5 | 9 | ACTIVE CONT. |
| (5) | 6 | 10 | DIVERSITY |
| (6) | 7 | 16 | DIVERSITY |
| (7) | 15 | 11 | DIVERSITY |
| (8) | 10 | 11 | DIVERSITY |
| | | | |

LINK IN DESIGNATED AREA (links (5)–(8))

FIG. 11
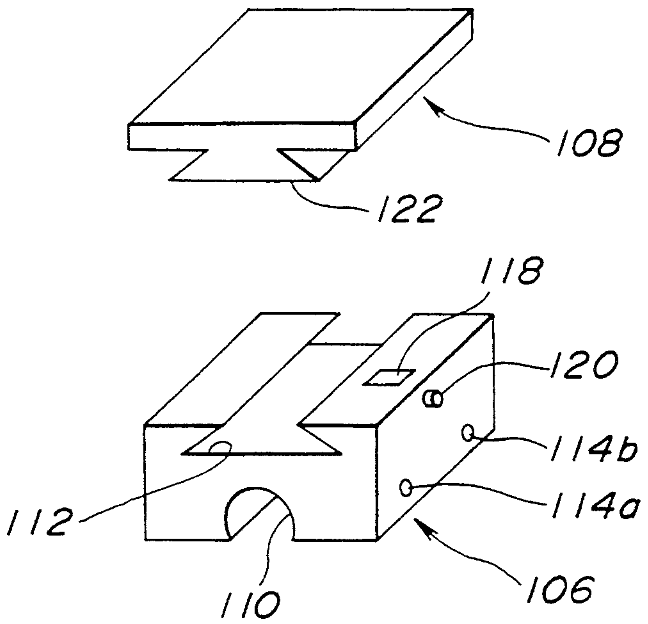
FIG. 13
FIG. 12
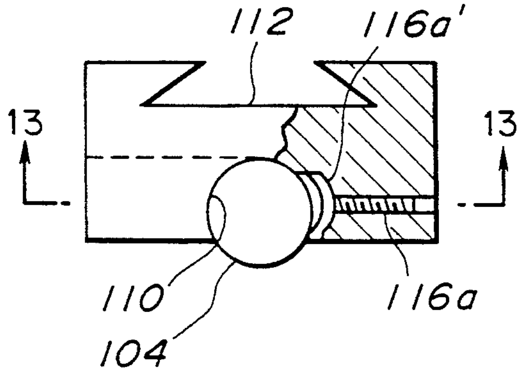
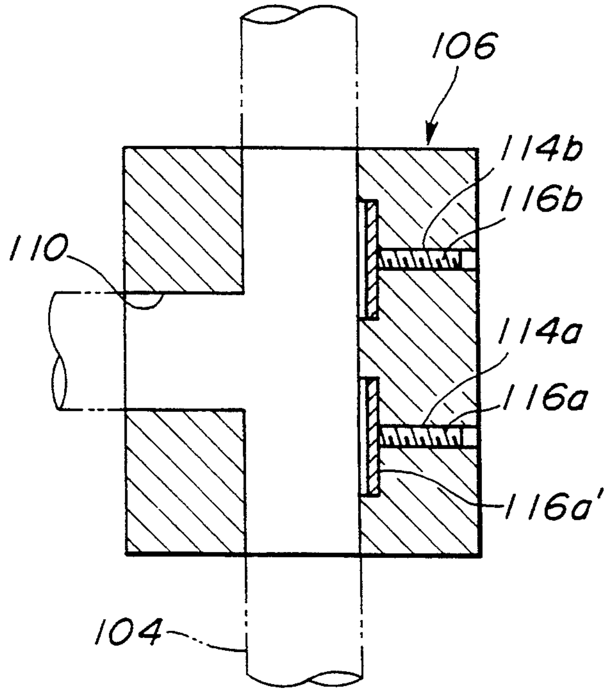

ELECTRONICALLY CONTROLLED ANTENNA SYSTEM

BACKGROUND OF THE INVENTION

1. Field of the Invention

The present invention relates in general to antenna systems mounted on motor vehicles, and more particularly, to electronically controlled antenna systems of a type which can change the antenna operation mode in accordance with the surrounding condition.

2. Description of the Prior Art

One of conventional electronically controlled antenna systems of the above-mentioned type is disclosed in "IEICE (INSTITUTE OF ELECTRONICS, INFORMATION AND COMMUNICATION ENGINEERS) TECHNICAL REPORT" Vol. 89, No. 250 RCS89-31 issued in 1989 from THE INSTITUTE OF ELECTRONICS, INFORMATION AND COMMUNICATION ENGINEERS. The system shown in the publication is of a so-called "multiplex wave suppressing adaptive array type". In the antenna system of this type, a plurality of antenna elements are arrayed, and operation weights of the elements are electronically controlled by a signal processor to direct the directivity of the antenna toward the transmitting source (or station) of the desired radio wave. That is, in this system, delayed radio waves which lower the quality of radio wave communication is suppressed. The signal processor comprises a frequency A/D (analog/digital)-converting section which is associated with each antenna element, a frame synchronizing section which selects, among signals received by the antenna elements, the most powerful signal and carries out a frame synchronization on the received signals, and a digital signal processing section which synthesizes the branched signals.

The antenna system of this type can exhibit a satisfied performance in an area, such as the suburbs, wherein the direction in and from which the desired radio wave comes to the antenna is generally constant. However, when the motor vehicle having such antenna system mounted thereon comes to an urban area where a plurality of large buildings stand close together, the system fails to exhibit the satisfied performance because the direction of the desired radio wave is caused to change at frequent intervals.

BRIEF DESCRIPTION OF THE INVENTION

It is therefore an object of the present invention to provide an electronically controlled antenna system which can exhibit a satisfied performance irrespective of the area where the antenna system is positioned.

According to the present invention, there is provided an electronically controlled antenna system which comprises an antenna having a plurality of antenna elements; first means for producing a plurality of antenna modes by using the antenna elements; second means for detecting a current position of the antenna; and third means for switching the antenna modes of the first means in accordance with the current position detected by the second means.

BRIEF DESCRIPTION OF THE DRAWINGS

FIGS. 3A and 3B are tables showing file structures of the data base of the map;

FIG. 11 is an exploded view of the antenna connector of FIG. 10;

FIG. 12 is a partially sectioned side view of one part of the antenna connector; and FIG. 13 is a sectional view taken along the line H—H of FIG. 12.

DETAILED DESCRIPTION OF THE INVENTION

Figure 1:
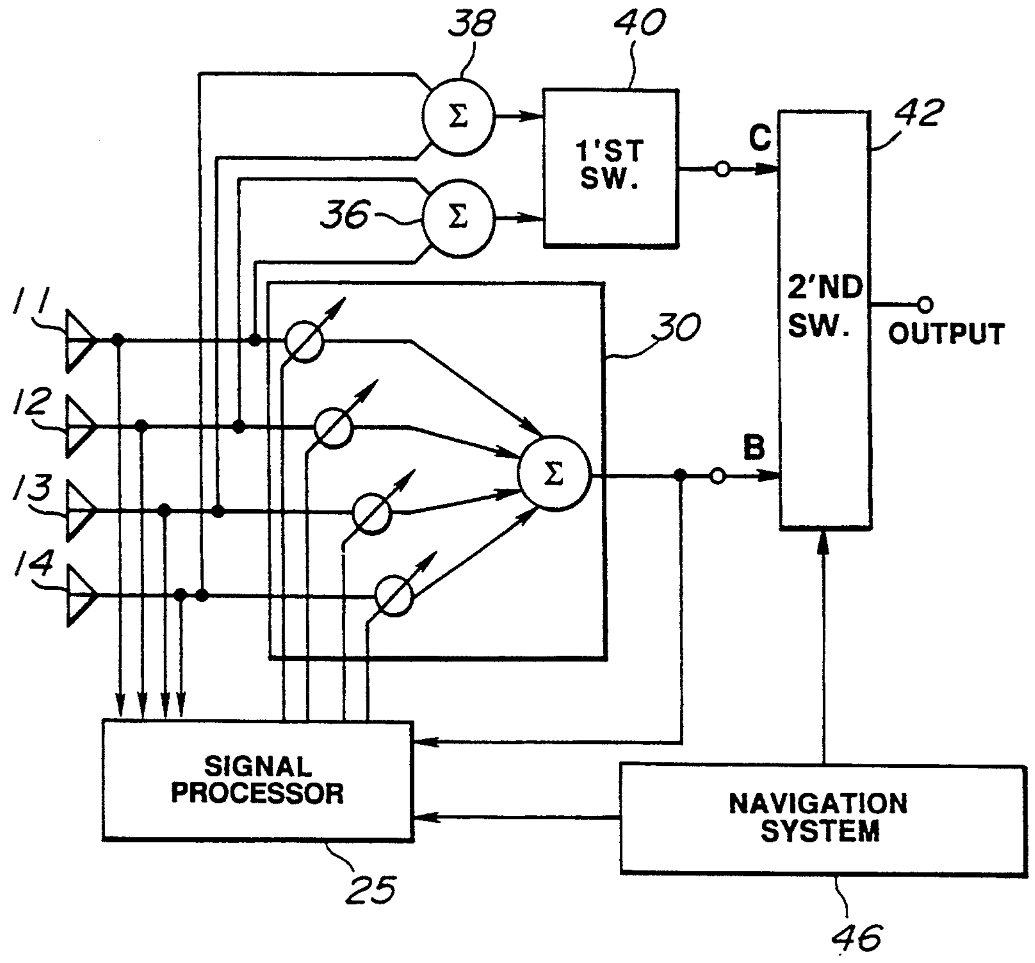
FIG. 1 is a block diagram showing a first embodiment of the present invention.

Referring to FIG. 1 of the drawings, there is schematically shown an antenna system which is a first embodiment of the present invention. The antenna system is applied to a communication device mounted in a motor vehicle.

The antenna system comprises a plurality (four in the illustrated embodiment) of antenna elements 11, 12, 13 and 14. Radio wave signals received by the antenna elements 11 to 14 are fed to a signal processor 25 and at the same time the signals are fed to a synthesizing device 30 controlled by the signal processor 25. The signals from the antenna elements 11 and 12 are fed to a synthesizer 36, while the signals from the antenna elements 13 and 14 are fed to another synthesizer 38. The signals treated by these two synthesizers 36 and 38 are applied to a first switch 40. Respective outputs from the first switch 40 and the synthesizing device 30 are applied to a second switch 42. Thus, by the function of the second switch 42, either the output from the first switch 40 or the output from the synthesizing device 30 is outputted from the second switch 42 as an output of the antenna system of the first embodiment.

Similar to the case of the above-mentioned conventional antenna system, the signal processor 25 comprises a frequency A/D (analog/digital)-converting section which is associated with each antenna element 11, 12, 13 or 14, a frame synchronizing section which selects, among signals received by the four antenna elements 11, 12, 13 and 14, the most powerful signal and carries out a frame synchronization on the received signals, and a digital signal processing section which synthesizes the branched signals. Thus, the multiplex wave suppressing adaptive array is provided.

The switching operation of the second switch 42 is controlled by a navigation system 46.

Figure 2:
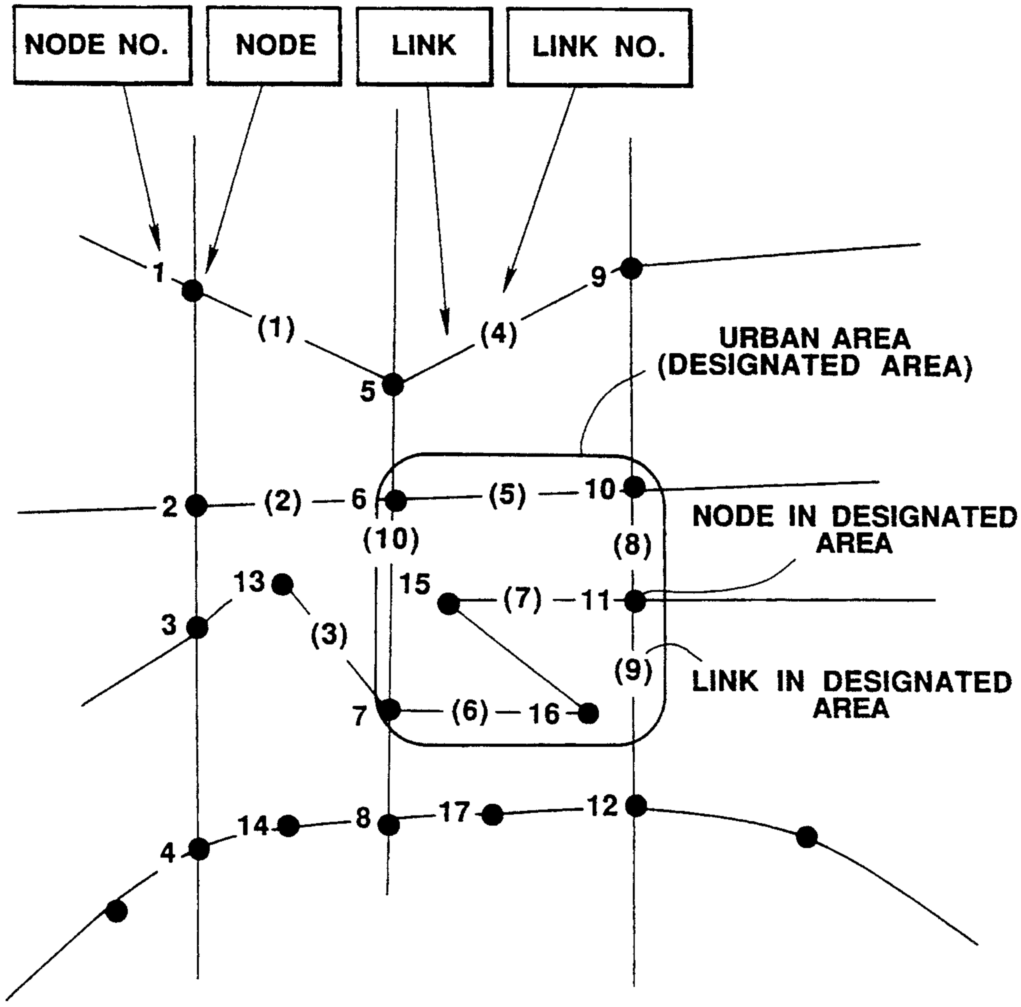
FIG. 2 is a drawing showing a display of a map provided by a known navigation system.

The navigation system 46 can detect the current position of the associated vehicle by means of Global Positioning System (GPS) or the like. That is, as is shown in FIG. 2, the navigation system 46 can display a road (or map) by using nodes and links, and can indicate or specify the current position of the vehicle on the displayed road.

The data base for the map comprises a node file structure as shown in FIG. 3A and a link file structure as shown in FIG. 3B. Each node and each link are controlled to have respective attributions. That is, in the illustrated embodiment, designating urban area as a diversity mode operation area, the nodes and links which display the part corresponding to the designated urban area have certain attributions to control the signal processor 25 under a diversity operation mode. That is, in the road display in FIG. 2, the nodes 6, 7, 10, 11, 15 and 16 and the links (5), (6), (7), (8) and (10) are positioned within the designated urban area, and thus they are treated to have the above-mentioned certain attributions for the diversity operation mode.

Figure 4:
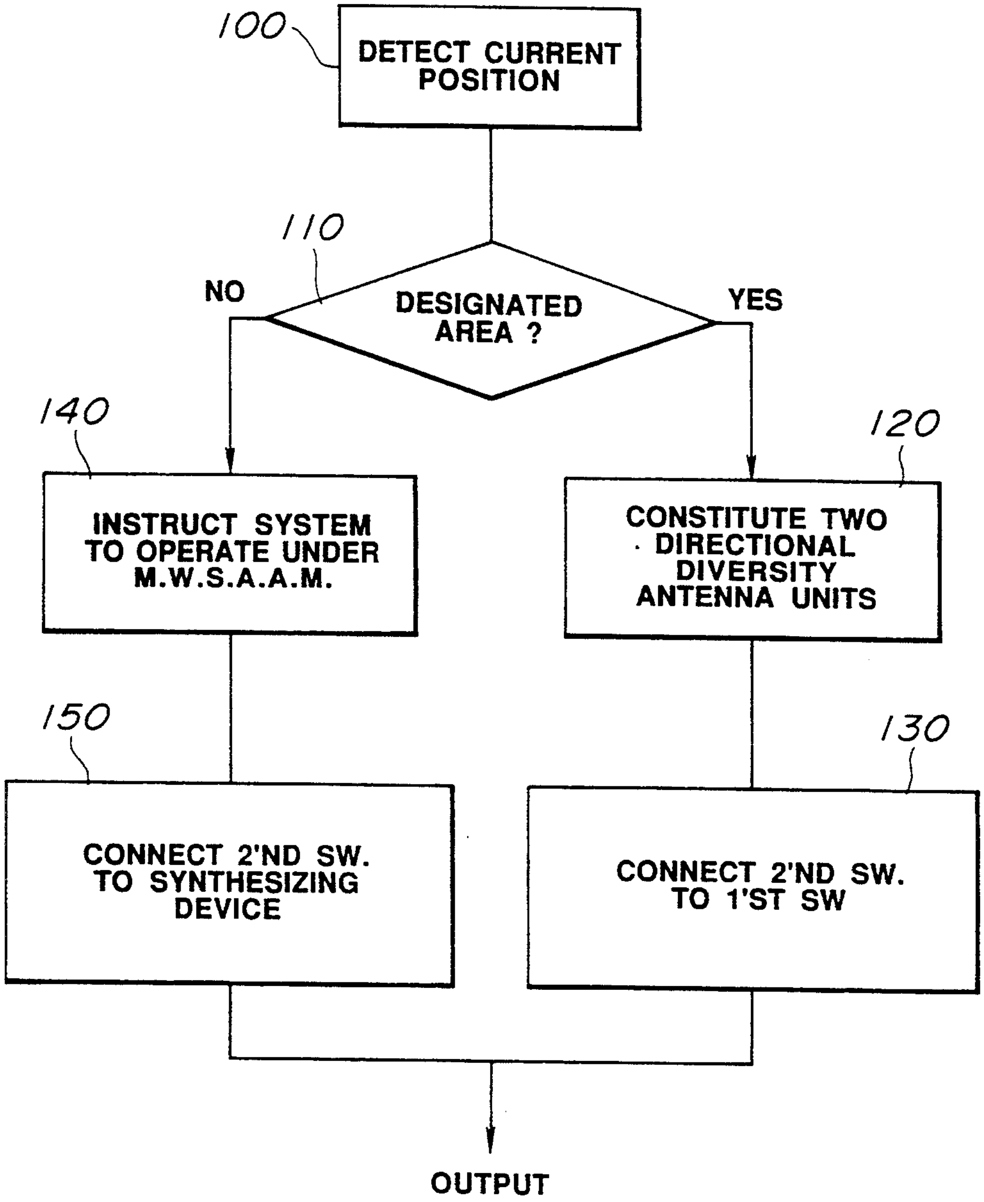
FIG. 4 is a flowchart showing operation steps carried out in a control unit of the first embodiment.

The antenna system of the first embodiment is controlled in a manner as is depicted by the flowchart of FIG. 4.

At step 100, the current position of the vehicle is detected by the navigation system 46.

Then, at step 110, a judgement is carried out as to whether the current position is within the designated urban area or not. That is, at this step, at first, a judgement is carried out as to whether or not the current vehicle position is on any of the nodes positioned within the designated area. If the current vehicle position is on the node, it is judged that the current vehicle position is within the designated urban area. If the current vehicle position is judged not on any of such nodes, a judgement is then carried out as to whether the current vehicle position is on any of the links positioned within the designated area. If the vehicle current position is on the link, it is judged that the vehicle position is within the designated urban area.

If YES at step 110, that is, if the current vehicle position is within the designated urban area, the operation flow goes to step 120, and if NO at step 110, that is, if the current vehicle position is not within the designated urban area, the operation flow goes to step 140.

Figure 5:
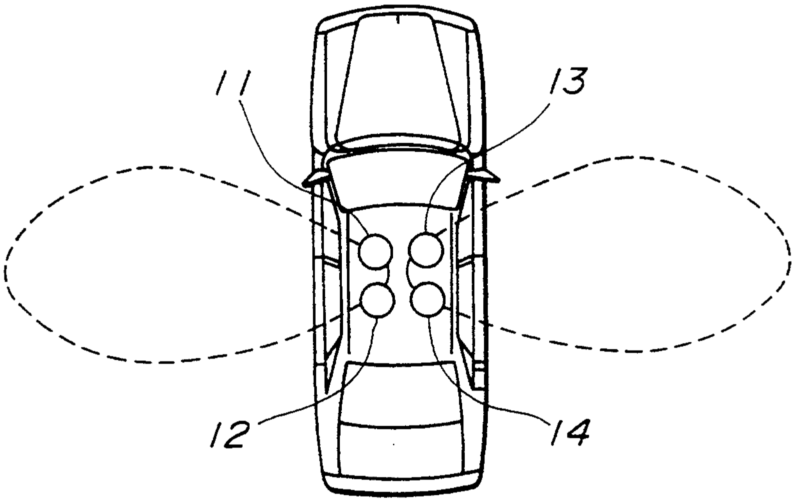
FIG. 5 is a drawing showing the directivity characteristic of the antenna system under a diversity operation mode.

At step 120, the signal processor 25 is suppressed from operating under an active control mode. That is, at this step, as is seen from FIG. 5, the four antenna elements 11, 12, 13 and 14 are divided into two groups to constitute two directional diversity antenna units, each unit consisting of two antenna elements. Then, at step 130, the second switch 42 (see FIG. 1) is switched to connect with the first switch 40, so that a signal C from the first switch 40 is outputted from the second switch 42 as an output signal for the directional diversity operation mode. The first switch 40 is of a known type which can automatically switch to one of the synthesizers 36 and 38 which outputs less noise.

Figure 6:
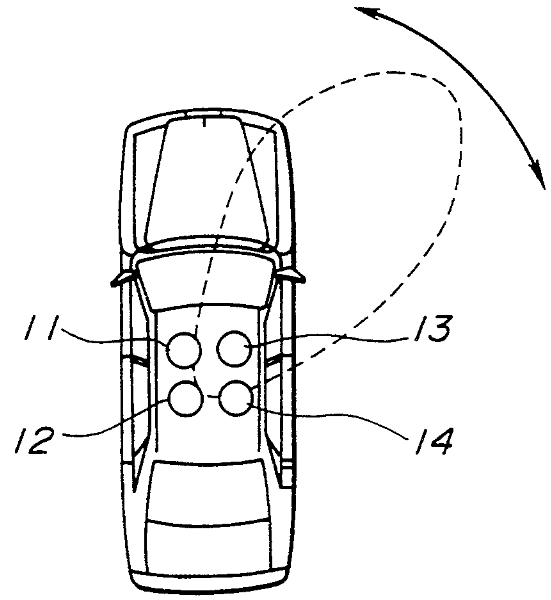
FIG. 6 is a drawing showing the directivity characteristic of the antenna system under a multiplex wave suppressing adaptive array operation mode.

While, at step 140, the signal processor 25 is instructed to operate under an active control mode. That is, as is seen from FIG. 6, the antenna system is instructed to operate under a multiplex wave suppressing adaptive array mode. Then, at step 150, the second switch 42 (see FIG. 1) is switched to connect with an output part of the synthesizing device 30, so that a signal B from the synthesizing device 30 is outputted from the second switch 42 as an output signal for the multiplex wave suppressing adaptive mode.

As is understood from the above, in the first embodiment of the present invention, the current position of the motor vehicle is detected by the navigation system. When the vehicle is detected to run in the non-designated area, such as the suburbs, the antenna system is controlled to operate under the multiplex wave suppressing adaptive array mode using the signal outputted from the synthesizing device 30. While, when the vehicle is detected to run in the designated area, such as the urban area, the antenna system is controlled to operate under the directional diversity mode using two antenna elements in each antenna unit. Accordingly, in the suburbs, receiving of radio wave with very high S/N ratio is achieved, and in the urban area, effective radio wave receiving is obtained irrespective of the wave condition wherein the radio wave frequently changes the advancing direction.

Although the directional diversity mode is used in the above-mentioned embodiment, a space diversity mode is also usable in the embodiment.

Figure 7:
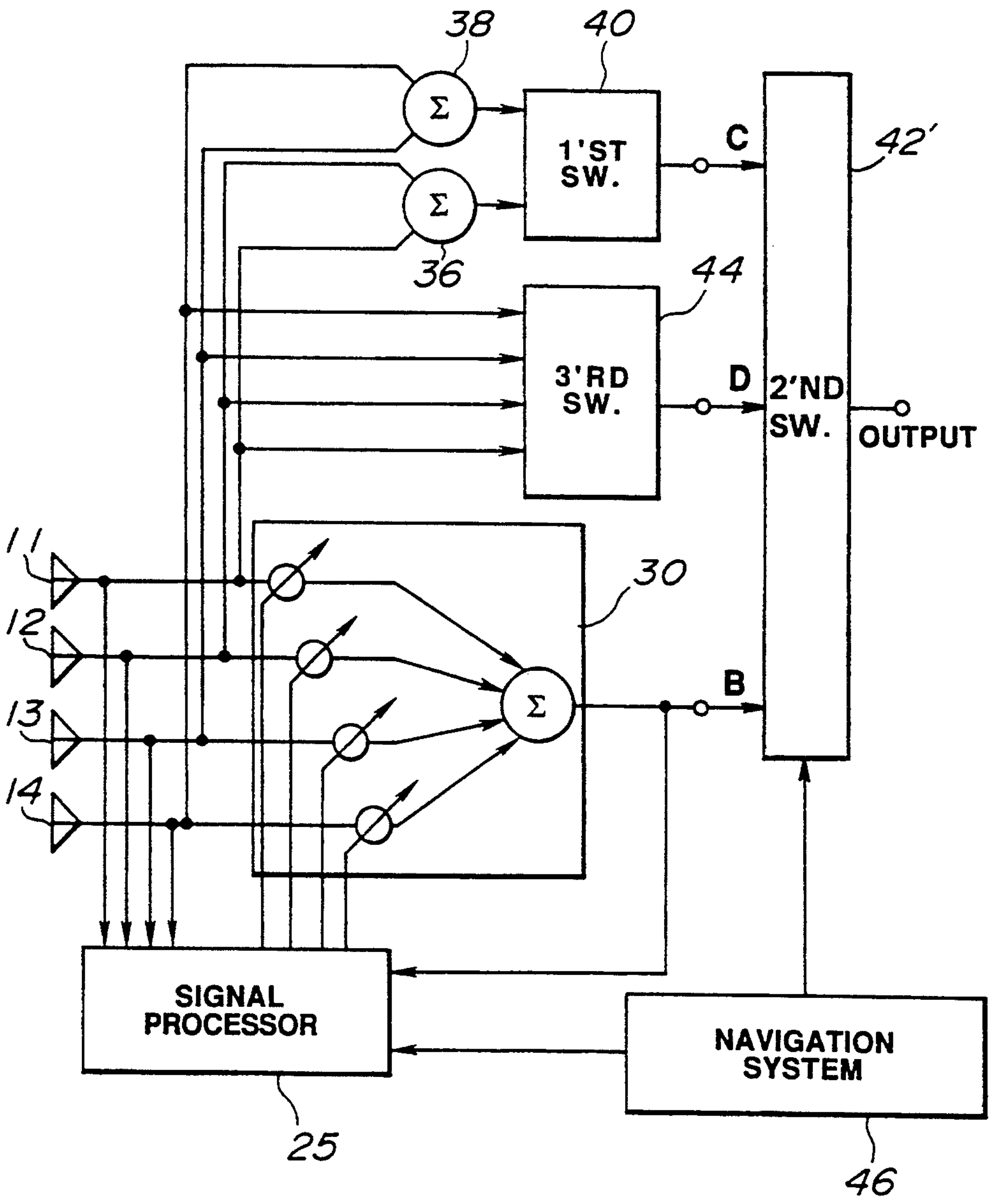
FIG. 7 is a block diagram showing a second embodiment of the present invention.

Referring to FIG. 7, there is schematically shown an antenna system which is a second embodiment of the present invention. In this second embodiment, a space diversity operation mode is further added in the antenna system. That is, in accordance with the radio wave condition of the area where the associated motor vehicle is placed, switching is automatically carried out between the multiplex wave suppressing adaptive array mode, the directional diversity mode and the space diversity mode.

As is seen from FIG. 7, in the second embodiment, a third switch 44 is further employed which is connected to the antenna elements 11, 12, 13 and 14. An output signal D from the third switch 44 is fed to the second switch 42'.

By the navigation system 46, three designated areas X, Y and Z are defined, which are for example the suburbs, a first group of urban areas where the directional diversity operation mode is suitable and a second group of urban areas where the directional diversity mode is not suitable. Similar to the above-mentioned first embodiment, the nodes and links which display the part corresponding to any of the designated areas X, Y and Z are treated to have certain attributions to control the signal processor 25 and the second switch 42'.

Figure 8:
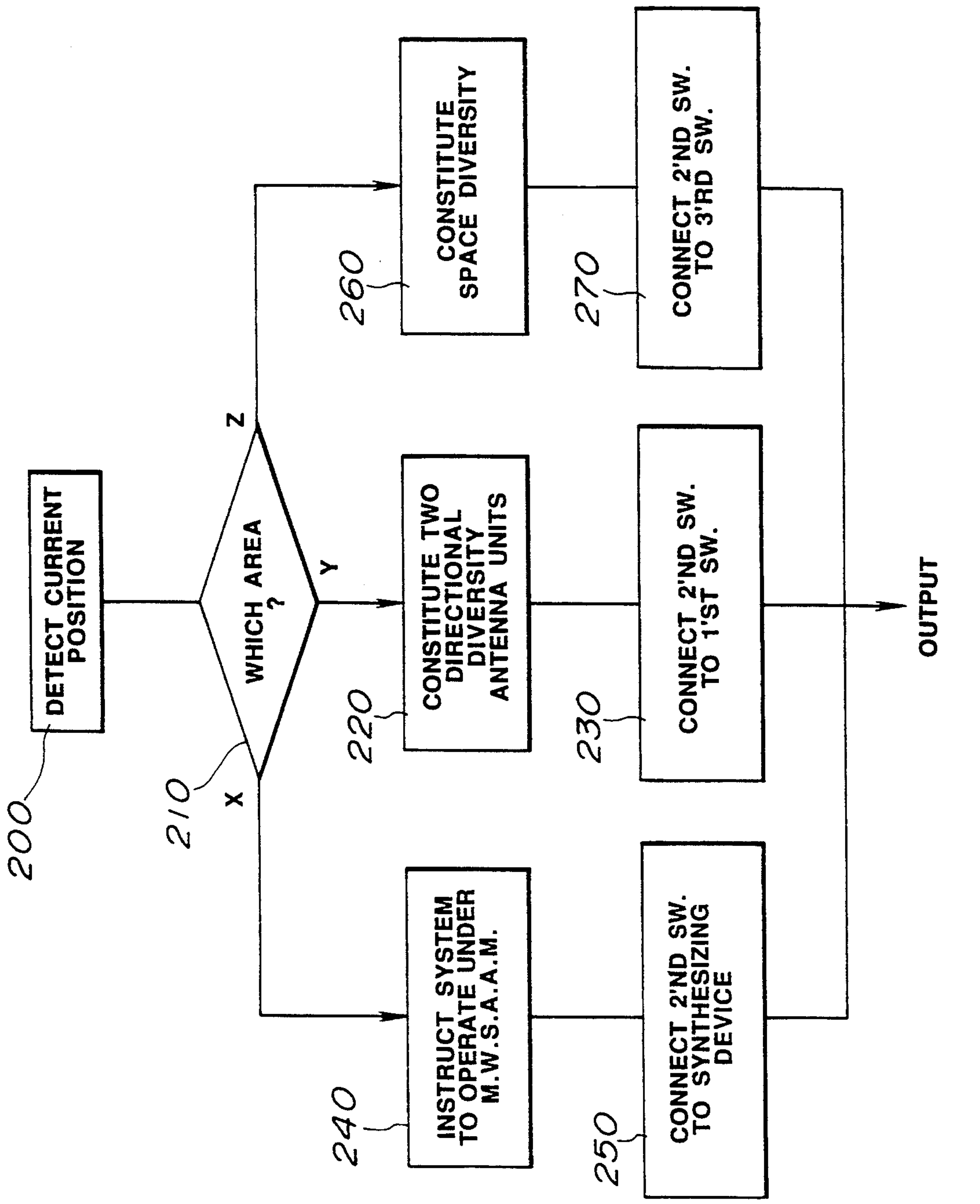
FIG. 8 is a flowchart showing operation steps carried out in a control unit of the second embodiment.

The antenna system of this second embodiment is controlled in a manner as is depicted by the flowchart of FIG. 8.

At step 200, the current position of the vehicle is detected by the navigation system 46.

Then, at step 210, a judgement is carried out as to which designated area X, Y or Z the detected current position belongs. This judgement is made based on the attributions of the nodes and links which indicate the current position.

If it is judged that the current position is within the designated area X, the operation flow goes to step 240. At this step 240, the signal processor 25 (see FIG. 7) is instructed to operate under an active control mode. That is, the antenna system is instructed to operate under the multiplex wave suppressing adaptive array mode using the signal outputted from the synthesizing device 30. Then, at step 250, the second switch 42' (see FIG. 7) is switched to connect with the output part of the synthesizing device 30, so that a signal B from the synthesizing device 30 is outputted from the second switch 42' as an output signal for the multiplex wave suppressing adaptive mode.

If, at step 210, it is judged that the current position is within the designated area Y, the operation flow goes to step 220. At this step 220, the signal processor 25 is suppressed from operating under the active control mode. That is, at this step, the four antenna elements 11,

12, 13 and 14 are divided into two groups to constitute two directional diversity antenna units, each unit consisting of two antenna elements. Then, at step 230, the second switch 42' (see FIG. 7) is switched to connect with the first switch 40, so that the signal C from the first switch 40 is outputted from the second switch 42' as an output signal for the directional diversity operation mode.

Figure 9:
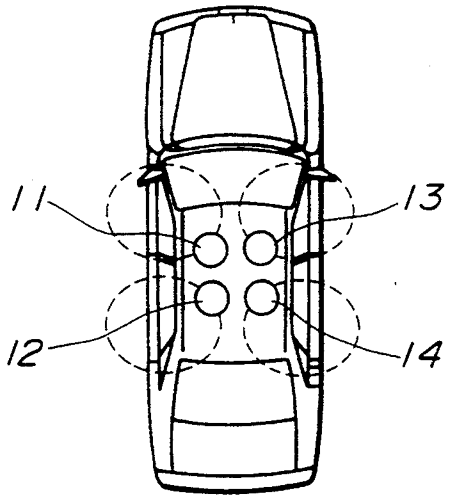
FIG. 9 is a drawing showing the directivity characteristic of the antenna system under a space diversity operation mode.
Figure 10:
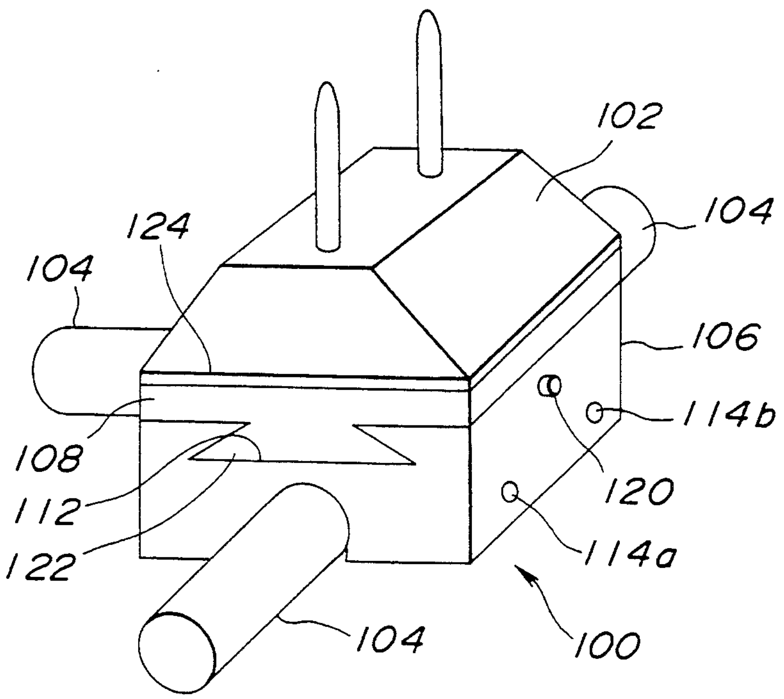
FIG. 10 is a perspective view of an antenna connector which is usable in the invention.

While, if, at step 210, it is judged that the current position of the vehicle is within the designated area Z, the operation flow goes to step 260. At this step 260, the signal processor 25 is suppressed from operating under the active control mode. That is, as is seen from FIG. 9, the antenna system is instructed to operate under the space diversity mode. Then, at step 270, the second switch 42' (see FIG. 7) is switched to connect with the third switch 44, so that the signal D from the third switch 44 is outputted from the second switch 42' as an output signal for the space diversity mode. The third switch 44 is of a type which can automatically switch to one of the antenna elements 11, 12, 13 and 14, which outputs less noise.

As is known, in order to obtain a good radio receiving, the antenna unit is sometimes mounted on a roof of the vehicle. However, if the vehicle has a carrier bar, such as ski carrier bar, boat carrier bar or the like, which is mounted on the roof in a manner to surround and cover the antenna unit, the carrier bar interrupts the work of the antenna unit.

Referring to FIGS. 10 to 13, there is shown a connector 100 which is used for connecting the antenna unit 102 to the carrier bar 104 for solving the above-mentioned problem.

The carrier bar 104 illustrated in the drawings has a T-shaped joint portion to which the antenna unit 102 is detachably mounted through the connector 100.

As is understood from FIG. 11, the connector 100 comprises generally lower and upper plastic members 106 and 108 which are detachably coupled.

The lower member 106 is formed at its lower surface with a generally T-shaped groove 110 and at its upper surface with a dove-tail shaped groove 112. Furthermore, the lower member 106 is formed at its one side wall with two bores **114*a* and 114*b*. As is seen from FIG. 13, each bore 114*a* or 114*b* receives therein a retainer bolt 116*a* or 116*b* which has a holder plate 116*a*' or 116*b*' pivotally connected to an inner end thereof. Although not shown in the drawings, a pivotal hook arm is installed in the lower member 106, which is projectable to the outside through an opening 118. For manipulating the hook arm, a key (not shown) can be inserted into a key hole 120 formed in the lower member 106**.

The upper member 108 is formed at its lower surface with a dove-tail shaped ridge 122 which is slidably engageable with the dove-tail shaped groove 112 of the lower member 106. Although not shown in the drawings, the upper member 108 is provided at its lower surface with a projection to which the pivotal hook arm of the lower member 106 is engageable. As is seen from FIG. 10, the antenna unit 102 is connected to an upper surface of the upper member 108 through an adhesive tape 124.

In order to connect the antenna unit 102 to the carrier bar 104, the following steps are taken.

First, as is seen from FIG. 13, the lower member 106 of the connector 100 is mounted on the T-shaped joint portion of the carrier bar 104. That is, upon this mounting, the T-shaped groove 110 of the lower member 106 is intimately engaged with the T-shaped joint point portion of the carrier bar 104. Then, the retainer bolts **116*a* and 116*b* are turned by using a known tool for tightly fixing the lower member 106 to the carrier bar 104. Then, the upper member 108 to which the antenna unit 102 has been bonded is mounted to the lower member 106 by slidably engaging the dove-tail shaped ridge 122 with the dove-tail shaped groove 112 of the lower member 106. Then, the key is inserted into the key hole 120 of the lower member 106 to establish a latched engagement between the lower and upper members 106 and 108**.

What is claimed is:

1. An electronically controlled antenna system comprising:
   - an antenna having a plurality of antenna elements;
   - first means for producing a plurality of antenna modes by using the antenna elements;
   - second means for detecting a current position of said antenna; and
   - third means for switching said antenna modes of said first means in accordance with the current position detected by said second means.

2. An electronically controlled antenna system as claimed in claim 1, in which said antenna modes comprise a directional diversity mode and a multiplex wave suppressing adaptive mode.

3. An electronically controlled antenna system as claimed in claim 2, in which said third means selects the directional diversity mode when said second means detects that the antenna is located in an urban area, and said third means selects the multiplex wave suppressing adaptive mode when said second means detects that the antenna is located in an area other than said urban area.

4. An electronically controlled antenna system as claimed in claim 3, in which said third means comprises:
   - a first switch which switches to one of synthesizers which are respectively connected to first and second groups of the antenna elements of said antenna #or producing the directional diversity mode; and
   - a second switch which switches to one of said first switch and a synthesizing device, said synthesizing device being connected to all of said first and second groups of the antenna elements for producing the multiplex wave suppressing adaptive mode.

5. An electronically controlled antenna system as claimed in claim 1, in which said antenna modes comprise a multiplex wave suppressing adaptive mode, a directional diversity mode and a space diversity mode.

6. An electronically controlled antenna system as claimed in claim 5, in which said third means selects the multiplex wave suppressing adaptive mode when said second means detects that the antenna is located in the suburbs, said third means selects the directional diversity mode when said second means detects that the antenna is located in a first group of urban areas, and said third means selects the space diversity mode when said second means detects that the antenna is located in a second group of urban areas.

7. An electronically controlled antenna system as claimed in claim 6, in which said third means comprises:
   - a first switch which switches to one of synthesizers which are respectively connected to first and second groups of the antenna elements of said antenna for producing the directional diversity mode;

a third switch which are connected to all of said first and second groups of the antenna elements for producing the space diversity mode; and a second switch which switches to one of said first switch, said third switch and a synthesizing device, said synthesizing device being connected to all of said first and second groups the antenna elements for producing the multiplex wave suppressing adaptive mode.

8. An electronically controlled antenna system as claimed in claim 1, in which said first means is a signal processor which comprises:

a frequency A/D (analog/digital)-converting means which is electrically connected to the antenna elements;

a frame synchronizing means which selects, among signals received by the antenna elements, the most powerful signal and carries out a frame synchronization on the received signals; and a digital signal processing means which synthesizes branched signals.

9. An electronically controlled antenna system as claimed in claim 8, in which said second means is a global positioning system, said global positioning system displaying a map by using nodes and links and indicating and specifying the current position of said antenna on the displayed map.

10. An electronically controlled antenna system as claimed in claim 1, further comprising an antenna connector which connects an antenna unit of said antenna to a carrier bar mounted on a roof of a motor vehicle.

11. An electronically controlled antenna system as claimed in claim 10, in which said antenna connector comprises:

a lower member detachably connected to said carrier bar;

an upper member having said antenna unit mounted thereon; and latch means for detachably connecting said upper member to said lower member.

* * * * *